Sept. 23, 1952 R. VIBERT 2,611,337
FISH EGG HATCHING DEVICE
Filed April 5, 1950
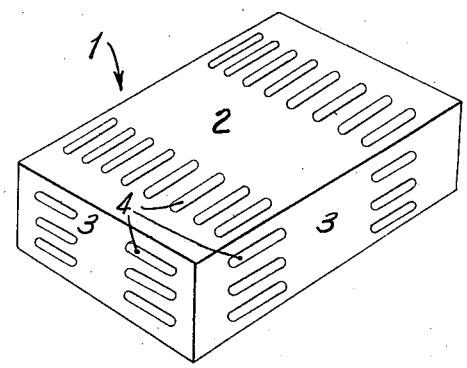
Inventor
Richard Vibert
By Robert E. Burns
Attorney Patented Sept. 23, 1952

2,611,337

UNITED STATES PATENT OFFICE 2,611,337

FISH EGG HATCHING DEVICE

Richard Vibert, Oloron Sainte-Marie, France

Application April 5, 1950, Serial No. 154,082
In France April 21, 1949

3 Claims. (Cl. 119—3)

My invention is concerned with a method of restocking streams with trouts, salmons and other fishes having similar breeding habits which consists in imitating natural conditions as closely as possible.

One is aware that the egg once impregnated will ony remain transportable for a comparatively short time (one day) after which it must be allowed to rest until the embryo is formed whereas once the embryo is formed in the egg the latter is transportable on condition that it is kept moist and cool.

It is common practice to gather the eggs of sexually mature females, whether wild or bred, and to spray them with a milt of males. The impregnated eggs thus obtained are washed and laid in tray-like incubators arranged in vats supplied with running water. Every second or at the most third day it is necessary to remove the dead eggs that have got whitish, for want of which the latter are attacked by mould which contaminates the neighboring ones. As a consequence of the aforesaid necessity only a thin layer of eggs can be accommodated in the incubator.

After a time which is variable depending on the species and the temperature of the water the fry hatches and their bags are resorbed progressively. Not long before the resorption is completed it becomes necessary to begin with the nursing of the fry with such a food as veal spleen or liver, yolk, curd, and so on, all of which are costly aliments which cannot be obtained in large amounts.

The fry may be set free as soon as the bag is resorbed or later on depending on the peculiarities of the river, the site and the food available.

It is conveyed to the dumping places in large cans on a small truck or in hilly regions on mule back; however, if more than ten to twenty thousands fry are to be dealt with it is advisable to provide one's self with oxygen cylinders and diffusors. The fry must be cast at a great many different places and each time in a very small number of individuals.

The necessity of satisfying all these requirements leads to considerable labour costs and to the obtainment of usually underfed fry which in addition is cast in frequently unfavorable conditions, so that dissappointing results are obtained; in addition, the said necessity involves the existence of costly piscicultural establishments which obviously cannot be installed in the neighborhood of every stream to be restocked.

These inconveniences have already incited several inventors to design portable incubators.

Thus, as such, a 50 x 50 x 15 cm. flat zinc box has been proposed having perforated sides. The eggs are laid in a thin layer on the bottom of the box and same is sunk to the bottom of the river. Following the resorption of the sack the fry get out by themselves through the perforations in the box sides. However, such a box is bulky and few eggs can be deposited therein as compared to its size; it requires at least a minimum of attendance and cannot be allowed to get lost.

A further incubator is also known which consists of a 16 x 21 x 3 cm. honeycomb. The two larger faces are covered with a closely woven metal gauze. It comprises 500 cells each of which contains one egg. Once loaded the incubator is suspended in the river at the proper places; the dead eggs cannot contaminate the sound ones since each egg is isolated in its cell. Such an incubator requires at least a minimum of attendance together with the cleaning of the wire gauze from time to time and the opening of the cover at the right time in order to liberate the fry. The said apparatus has been used practically up to the present although it is rather dear and heavy and must be recovered.

The method according to my invention is based upon the recognition of the fact that such fish species as trouts and salmons will lay their spherical eggs on the bottom below pebble stones, gravel and sand. Said eggs are by no means scattered; they are rather gathered in cavities between the pebble stones, in which cavities the dead eggs will not contaminate the sound ones, a consequence of the fact that the incubation process goes on completely in the dark.

Consequently, the method according to my invention consists in arranging trout or salmon eggs, whether only milted or in which the embryo is already formed, in packing boxes suitable for the transportation of the eggs and provided with apertures of such size that the fry and not the eggs can get out of them. The eggs may be dispatched by the supplier as usual in trays with a fabric bottom on which the eggs are arranged and which are piled up with a provision of ice in the topmost one, the whole pile is wrapped in strong paper and carefully heat-insulated in a box with sawdust or wood wool. The consignee then needs only to unpack the trays, to load his own fry-breeding boxes with eggs and to place them in an ordinary fishing basket packed with moist moss for their transportation to the places to be restored. Or the fry breeding boxes according to the invention are dispatched ready-loaded by the consignor. In this case, the boxes themselves are piled up instead of the trays and covered with ice. The consignee then needs only to take out the breeding boxes and to bring them to the desired places.

At each restocking place known to be also natural spawning places the bottom is stirred to eliminate the mud and the exceedingly fine sand as do the fishes themselves and the boxes are immersed and embedded in the gravel. The results obtained with the packing and breeding boxes according to the invention are comparable, as to the number of individuals having resorbed their sacks, liberated and acclimatized to the particular river, to those obtained with comparison lots obtained by pisciculture before the fry is dumped and consequently before the acclimatization crisis, the individuals moreover being about 15% heavier.

Practically, breeding boxes of preferably rectangular parallelepipedal shape should be used for the sake of convenience in the storing of the empty boxes and the packing of the loaded ones.

For the purpose of exemplification and by no means of limitation a parallelepipedal box 1 is illustrated in perspective view in the appended drawing. The box 1 has a top and bottom 2, side walls 3, and is made of a transparent plastic material and is provided with oblong orifices 4 (e. g. 6 mm. in width for salmon) adapted to retain the eggs while allowing the fry to escape even with their still unresorbed sacks, i. e. the orifices are of a width which is slightly less than the diameters of the spherical eggs but greater than the smallest dimension of the fry which hatch from the eggs. In this manner it is possible to transfer the eggs from the production centres to their natural abode amongst the pebble stones, gravel and sand of the streams to be restocked with no more manipulations than shipping the boxes and embedding the same.

What I claim is:

1. A device for transporting spherical fish eggs and effecting the direct hatching thereof in their natural environment under conditions closely simulating natural hatching, which comprises a closed container having a top, a bottom and side walls, said container being adapted to receive said spherical eggs and to be embedded in gravelly river bottoms normally utilized as spawning-grounds by wild breeders, and at least the side walls of said container being provided with a plurality of spaced spertures having a width slightly less than the diameter of said eggs but greater than the smallest dimension of the fry which hatch from said eggs.

2. A device for transporting spherical fish eggs and effecting the direct hatching thereof in their natural environment under conditions closely simulating natural hatching which comprises a closed container having a top, a bottom and side walls, said container being adapted to receive said spherical eggs and to be embedded in gravelly river bottoms normally utilized as spawning-grounds by wild breeders, the walls of said container having a strength sufficient to withstand deformation when said container is stacked with a plurality of like containers and when said container is embedded in the river bottom, and at least the side walls of said container being provided with a plurality of spaced oblong apertures having a width slightly less than the diameter of said eggs but greater than the smallest dimension of the fry which hatch from said eggs.

3. A device for transporting spherical fish eggs and effecting the direct hatching thereof in their natural environment under conditions closely simulating natural hatching which comprises a closed parallelepipedal container having a top, a bottom and side walls formed from transparent material, said container being adapted to receive said spherical eggs and to be embedded in gravelly river bottoms normally utilized as spawning-grounds by wild breeders, and at least the side walls of said container being provided with a plurality of spaced oblong apertures having a width slightly less than the diameter of said eggs but greater than the smallest dimension of the fry which hatch from said eggs.

RICHARD VIBERT.

REFERENCES CITED

The following references are of record in the file of this patent:

UNITED STATES PATENTS

| Number | Name | Date |
| --- | --- | --- |
| 148,035 | Clark | Mar. 3, 1874 |

FOREIGN PATENTS

| Number | Country | Date |
| --- | --- | --- |
| 59,987 | Austria | July 10, 1913 |